(12) United States Patent
Quigley et al.

(10) Patent No.: US 6,286,558 B1
(45) Date of Patent: Sep. 11, 2001

(54) COMPOSITE SPOOLABLE TUBE

(75) Inventors: Peter A. Quigley, Pocasset; Stephen C. Nolet, Franklin, both of MA (US); Jerry G. Williams, The Woodlands, TX (US)

(73) Assignee: Fiberspar Corporation, West Wareham, MA (US)

( * ) Notice: Subject to any disclaimer, the term of this patent is extended or adjusted under 35 U.S.C. 154(b) by 0 days.

(21) Appl. No.: 09/597,201

(22) Filed: Jun. 20, 2000

Related U.S. Application Data

(63) Continuation of application No. 09/295,289, filed on Apr. 20, 1999, which is a continuation of application No. 08/804,790, filed on Feb. 24, 1997, now Pat. No. 5,921,285, which is a continuation-in-part of application No. 08/720,029, filed on Sep. 27, 1996, now Pat. No. 6,016,845.
(60) Provisional application No. 60/004,452, filed on Sep. 28, 1995.

(51) Int. Cl.[7] .................................................. F16L 11/12
(52) U.S. Cl. ........................ 138/125; 138/130; 138/129; 138/144; 138/174; 174/47
(58) Field of Search ................................. 138/125, 123, 138/124, 129–133, 140, 141, 153, 172, 174, DIG. 3, DIG. 2, 118, 111, 114; 174/47, 502.5, 500.5; 428/36.1, 36.9

(56) References Cited

U.S. PATENT DOCUMENTS

Re. 29,112 * 1/1977 Carter .................................... 156/156
Re. 35,081 * 11/1995 Quigley ............................... 428/36.2

(List continued on next page.)

FOREIGN PATENT DOCUMENTS

4214383 * 9/1993 (DE) .
0024512 * 3/1981 (EP) .
352148 * 1/1990 (EP) .
505815 * 9/1992 (EP) .
553110 * 8/1942 (GB) .
2255994 * 11/1992 (GB) .
2270099 * 3/1994 (GB) .

OTHER PUBLICATIONS

Sas–Jaworsky, A. and J.G. Williams, "Advanced composites enhance coiled tubing capabilities" World Oil, pp. 57–69 (Apr. 1994).*
Sas–Jaworsky, A. and J.G. Williams, "Development of a Composite Coiled Tubing for Oilfield Services", Society of Petroleum Engineers, SPE 26536, pp. 1–11 (1993).*
Sas–Jaworsky, A. and M.E. Teel, "Coiled tubing 1995 update: Production applications" World Oil, pp. 97–105 (Jun. 1995).*
Sas–Jaworsky, A. and J.G. Williams, "Enabling capabilities and Potential Applications of Composite Coiled Tubing", Proceedings of the World Oils's 2nd International Conference on Coiled Tubing Technology, pp. 2–9 (1994).*
Austigard E. and R. Tomter; "Composites Subsea: Cost Effective Products; an Industry Challenge", Subsea 94 International Conference, the 1994 Report on Subsea Engineering: The Continuing Challenges.

(List continued on next page.)

Primary Examiner—Patrick Brinson
(74) Attorney, Agent, or Firm—Foley, Hoag & Eliot, LLP

(57) ABSTRACT

A spoolable composite tube capable of being spooled onto a reel for storage and for use in oil field applications. The spoolable tube exhibits unique anistropic characteristics that provide improved burst and collapse pressures, increased tensile strength, compression strength, and load carrying capacity, while still remaining sufficiently bendable to be spooled onto a reel in an open bore configuration. The spoolable composite tube can include an inner liner, an interface layer, fiber composite layers, a pressure barrier layer, and an outer protective layer. The fiber composite layers can have a unique triaxial braid structure.

58 Claims, 5 Drawing Sheets

U.S. PATENT DOCUMENTS

| | | | | |
|---|---|---|---|---|
| 646,887 | * | 4/1900 | Stowe et al. | 174/47 |
| 1,930,285 | * | 10/1933 | Robinson | 138/143 |
| 2,648,720 | * | 8/1953 | Alexander | 174/34 |
| 2,690,769 | * | 10/1954 | Brown | 138/55 |
| 2,725,713 | * | 12/1955 | Banchard | 57/149 |
| 2,810,424 | * | 10/1957 | Swartswelter et al. | 154/1.8 |
| 3,116,760 | * | 1/1964 | Matthews | 138/125 |
| 3,277,231 | * | 10/1966 | Downey et al. | 174/47 |
| 3,334,663 | * | 8/1967 | Teterson | 138/132 |
| 3,379,220 | * | 4/1968 | Kiuchi et al. | 138/125 |
| 3,477,474 | * | 11/1969 | Mesler | 138/133 |
| 3,507,412 | * | 4/1970 | Carter | 214/338 |
| 3,522,413 | * | 8/1970 | Chrow | 174/47 X |
| 3,554,284 | * | 1/1971 | Nystrom | 166/250 |
| 3,579,402 | * | 5/1971 | Goldsworthy et al. | 156/392 |
| 3,604,461 | * | 9/1971 | Matthews | 138/137 |
| 3,606,402 | * | 9/1971 | Medney | 285/305 |
| 3,692,601 | * | 9/1972 | Goldsworthy et al. | 156/74 |
| 3,700,519 | * | 10/1972 | Carter | 156/156 |
| 3,701,489 | * | 10/1972 | Goldsworthy et al. | 242/7.21 |
| 3,734,421 | * | 5/1973 | Karlson et al. | 242/7.21 |
| 3,738,637 | * | 6/1973 | Goldsworthy et al. | 269/61 |
| 3,740,285 | * | 6/1973 | Goldsworthy et al. | 156/173 |
| 3,769,127 | * | 10/1973 | Goldsworthy et al. | 156/172 |
| 3,783,060 | * | 1/1974 | Goldsworthy et al. | 156/69 |
| 3,828,112 | * | 8/1974 | Johansen et al. | 174/47 |
| 3,856,052 | * | 12/1974 | Feucht | 138/119 |
| 3,860,742 | * | 1/1975 | Medney | 174/84 S |
| 3,933,180 | * | 1/1976 | Carter | 138/89 |
| 3,956,051 | * | 5/1976 | Carter | 156/429 |
| 3,957,410 | * | 5/1976 | Goldsworthy et al. | 425/183 |
| 3,960,629 | * | 6/1976 | Goldsworthy | 156/180 |
| 4,053,343 | * | 10/1977 | Carter | 156/172 |
| 4,057,610 | * | 11/1977 | Goettler et al. | 264/108 |
| 4,095,865 | * | 6/1978 | Denison et al. | 339/16 R |
| 4,108,701 | * | 8/1978 | Stanley | 174/47 X |
| 4,125,423 | * | 11/1978 | Goldsworthy | 156/428 |
| 4,133,972 | * | 1/1979 | Anderson et al. | 174/47 |
| 4,137,949 | * | 2/1979 | Linko, III et al. | 138/125 |
| 4,139,025 | * | 2/1979 | Carlstrom | 138/153 |
| 4,190,088 | * | 2/1980 | Lalikos et al. | 174/47 X |
| 4,200,126 | * | 4/1980 | Fish | 138/143 |
| 4,220,381 | * | 9/1980 | Van der Graaf | 339/16 C |
| 4,241,763 | * | 12/1980 | Antal et al. | 138/127 |
| 4,248,062 | * | 2/1981 | McLain et al. | 64/1 |
| 4,261,390 | * | 4/1981 | Belofsky | 138/125 |
| 4,303,457 | * | 12/1981 | Johansen et al. | 156/149 |
| 4,308,999 | * | 1/1982 | Carter | 242/7.02 |
| 4,336,415 | * | 6/1982 | Walling | 174/47 |
| 4,463,779 | * | 8/1984 | Wing et al. | 138/125 |
| 4,515,737 | * | 5/1985 | Karino et al. | 264/22 |
| 4,522,235 | * | 6/1985 | Kluss et al. | 138/130 |
| 4,530,379 | * | 7/1985 | Policelli | 138/109 |
| 4,556,340 | * | 12/1985 | Morton | 405/195 |
| 4,578,675 | * | 3/1986 | MacLeod | 340/855 |
| 4,627,427 | * | 12/1986 | Goettler et al. | 138/174 |
| 4,657,795 | * | 4/1987 | Foret | 428/36 |
| 4,681,169 | * | 7/1987 | Brookbank, III | 166/385 |
| 4,728,224 | * | 3/1988 | Salama et al. | 405/195 |
| 4,789,007 | * | 12/1988 | Cretel | 174/47 X |
| 4,992,787 | * | 2/1991 | Helm | 340/854 |
| 5,097,870 | * | 3/1992 | Williams | 138/115 |
| 5,170,011 | * | 12/1992 | Martucci | 174/47 |
| 5,172,765 | * | 12/1992 | Sas-Jaworsky et al. | 166/384 |
| 5,176,180 | * | 1/1993 | Williams et al. | 138/172 |
| 5,209,136 | * | 5/1993 | Williams | 74/502.5 |
| 5,285,008 | * | 2/1994 | Sas-Jaworsky et al. | 174/47 |
| 5,285,204 | * | 2/1994 | Sas-Jaworsky | 340/854.9 |
| 5,330,807 | * | 7/1994 | Williams | 428/34.5 |
| 5,334,801 | * | 8/1994 | Mohn | 174/47 |
| 5,348,096 | * | 9/1994 | Williams | 166/384 |
| 5,351,752 | * | 10/1994 | Wood et al. | 166/68 |
| 5,428,706 | * | 6/1995 | Lequeux | 174/47 X |
| 5,435,867 | * | 7/1995 | Wolfe et al. | 156/171 |
| 5,443,099 | * | 8/1995 | Chaussepied et al. | 138/109 |
| 5,469,916 | * | 11/1995 | Sas-Jaworsky et al. | 166/64 |
| 5,551,484 | * | 9/1996 | Charboneau | 138/104 |
| 5,730,188 | * | 3/1998 | Kalman et al. | 138/135 |
| 5,755,266 | * | 5/1998 | Aanonsen et al. | 138/174 |
| 5,828,003 | * | 10/1998 | Thomeer et al. | 174/69 |
| 5,933,945 | * | 8/1999 | Thomeer et al. | 29/825 |
| 5,951,812 | * | 9/1999 | Gilchrist, Jr. | 156/304.2 |

OTHER PUBLICATIONS

Connell Mike et al.; "Coiled Tubing: Application for Today's Challenges", Petroleum Engineer International, pp 18–21 (Jul. 1999).

Feechan Mike et al.; "Spoolable Composites Show Promise", The American Oil & Gas Reporter, pp. 44–50 (Sep. 1999).

Fowler Hampton; "Advanced Composite Tubing Usable", The American Oil & Gas Reporter, pp. 76–81 (Sep. 1997).

Fowler Hampton et al.; "Development Update and Applications of an Advanced Composite Spoolable Tubing", Offshore Technology Conference held in Houston Texas from $4^{th}$ to $7^{th}$ of May 1998, pp. 157–162.

Hahn H. Thomas and Williams G. Jerry; "Compression Failure Mechanisms in Unidirectional Composites", NASA Technical Memorandum pp. 1–42 (Aug. 1984).

Hansen et al.; "Qualification and Verification of Spoolable High Pressure Composite Service Lines for the Asgard Field Development Project", paper presented at the 1997 Offshore Technology Conference held in Houston Texas from $5^{th}$ to $8^{th}$ of May 1997, pp. 45–54.

Haug et al.; "Dynamic Umbilical with Composite Tube (DUCT)", Paper presented at the 1998 Offshore Technology Conference held in Houston Txas from $4^{th}$ to $7^{th}$, 1998; pp. 699–712.

Lundberg et al.; "Spin-off Technologies from Development of Continuous Composite Tubing Manufacturing Process", Paper presented at the 1998 Offshore Technology Conference held in Houston, Texas from $4^{th}$ to $7^{th}$ of May 1998 pp. 149–155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from $5^{th}$ to $6^{th}$ of Apr., 2000, pp. 1–9.

Measures, R. M.; "Smart Structures with Nerves of Glass", Prog. Aerospace Sci. 26(4): 289–351 (1989).

Measures et al.; "Fiber Optic Sensors for Smart Structures", Optics and Lasers Engineering 16: 127–152 (1992).

Poper Peter; "Braiding", International Encyclopedia of Composites, Published by VGH, Publishers, Inc., 220 East $23^{rd}$ Street, Suite 909, New York, NY 10010.

Quigley et al.; "Development and Application of a Novel Coiled Tubing String for Concentric Workover Services", Paper presented at the 1997 Offshore Technology Conference held in Houston, Texas from $5^{th}$ to $8^{th}$ of May 1997, pp. 189–202.

Sas–Jaworsky II and Bell Steve "Innovative Applications Stimulate Coiled Tubing Development", World Oil, 217(6): 61 (Jun. 1996).

Sas–Jaworsky IIand Mark Elliot Teel; "Coiled Tubing 1995 Update: Production Applications", World Oil, 216 (6): 97 (Jun. 1995).

Sas–Jaworsky II Alex.; "Developments Position CT for Future Prominence", The American Oil & Gas Reporter, pp. 87–92 (Mar. 1996).

Moe Wood T. et al.; "Spoolable, Composite Piping for Chemical and Water Injection and Hydraulic Valve Operation", Proceedings of the $11^{th}$ International Conference on Offshore Mechanics and Arctic Engineering–1992–, vol. III, Part A—Materials Engineering, pp. 199–207 (1992).

Shuart J. M. et al.; "Compression Behavior of ±45° –Dominated Laminates with a Circular Hole or Impact Damage", AIAA Journal 24(1): 115–122 (Jan. 1986).

Silverman A. Seth; "Spoolable Composite Pipe for Offshore Applications", Materials Selection & Design pp. 48–50 (Jan. 1997).

Rispler K. et al.; "Composite Coiled Tubing in Harsh Completion/Workover Environments", Paper presented at the SPE GAS Technology Symposium and Exhibition held in Calgary, Alberta, Canada, on Mar. 15–18, 1998, pp. 405–410.

Williams G. J. et al.; "Composite Spoolable Pipe Development, Advancements, and Limitations", Paper presented at the 2000 Offshore Technology Conference held in Houston Texas from $1^{st}$ to $4^{th}$ of May 2000, pp. 1–16.

* cited by examiner

COMPOSITE SPOOLABLE TUBE

RELATED APPLICATIONS

The current application is a continuation of and incorporates by reference commonly-owned, copending U.S. patent application Ser. No. 09/295,289, filed Apr. 20, 1999, which is a continuation of and incorporates by reference commonly-owned U.S. patent application Ser. No. 08/804,790, filed on Feb. 24, 1997, now U.S. Pat. No. 5,291,285, which is a continuation-in-part of and incorporates by reference the commonly-owned, co-pending U.S. patent application Ser. No. 08/720,029, filed on Sep. 27, 1996, now U.S. Pat. No. 6,016,845 which claims the benefit of U.S. Provisional Application No. 60/004,452, filed Sep. 28, 1995.

BACKGROUND OF THE INVENTION

The present invention relates generally to spoolable tubing suitable for use in the oil industry, and more particularly to spoolable tubing consisting of a composite material with the ability to withstand high stress.

Spoolable tubing, that is tubing capable of being spooled upon a reel, is commonly used in numerous oil well operations. Typical oil well operations include running wire line cable down hole with well tools, working over wells by delivering various chemicals down hole, and performing operations on the interior surface of the drill hole. The tubes used are required to be spoolable so that the tube can be used in conjunction with one well and then transported on a reel to another well location. Steel coiled tubing is typically capable of being spooled because the steel used in the product exhibits high ductility (i.e. the ability to plastically deform). Unfortunately, the repeated spooling and use of steel coiled tubing causes fatigue damage that can suddenly cause the steel coiled tubing to fracture and fail. The hazards of operating steel coiled tubing, i.e. risk to personnel and high economic cost resulting from down time needed to retrieve the broken tubing sections, forces steel coiled tubing to be retired after a relatively few number of trips into a well.

Steel coiled tubing has also proven to be subject to expansion after repeated uses. Tube expansion results in reduced wall thickness with the associated reduction in the pressure carrying capability of the steel coiled tubing. Steel coiled tubing known in the art is typically limited to an internal pressure up to about 5,000 psi. Accordingly, higher pressure and continuous flexing typically reduces the steel tube's integrity and service life.

For example, the present accepted industry standard for steel coiled tube is an A-606 type 4 modified HSLA steel with yield strengths ranging from 70 ksi to 80 ksi. The HSLA steel tubing typically undergoes bending, during the deployment and retrieval of the tubing, over radii significantly less than the minimum bending radii needed for the material to remain in an elastic state. The repeated bending of steel coiled tubing into and out of plastic deformation induces irreparable damage to the steel tube body leading to low-cycle fatigue failure.

Additionally, when steel coiled tubing is exposed to high internal pressures and bending loads, the isotropic steel is subjected to high triaxial stresses imposed by the added pressure and bending loads. The high triaxial stresses result in significant plastic deformation of the tube and diamnetral growth of the tube body, commonly Ereferred to as "ballooning". When the steel coiled tube experiences ballooning, the average wall thickness of the tube is reduced, and often causes a bursting of the steel tube in the area of decreased thickness.

Steel coiled tubes also experience thinning of the tube walls due to the corrosive effect of materials used in the process of working over the well and due to materials located on the inner surface of the well bore. The thinning resulting from corrosive effects of various materials causes a decrease in the pressure and the tensile load rating of the steel coiled tubing.

It is, therefore, desirable to provide a non-steel coil tubing which is capable of being deployed and spooled under borehole conditions, which does not suffer from the limitations of steel tubing and is highly resistant to chemicals.

For the most part, prior art non-metallic tubular structures that are designed for being spooled and also for transporting fluids, are made as a hose whether or not they are called a hose. An example of such a hose is the Feucht structure in U.S. Pat. No. 3,856,052 which has longitudinal reinforcement in the side walls to permit a flexible hose to collapse preferentially in one plane. However, the structure is a classic hose with vulcanized polyester cord plies which are not capable of carrying compression loads or high external pressure loads. Hoses typically use an elastomer such as rubber to hold fiber together but do not use a high modulus plastic binder such as epoxy. Hoses are designed to bend and carry internal pressure but are not normally subjected to external pressure or high axial compression or tension loads.

When the ends of a hose are subjected to opposing forces, the hose is said to be under tension. The tensile stress at any particular cross-section of the hose is defined as the ratio of the force exerted on that section by opposing forces to the cross-sectional area of the hose. The stress is called a tensile stress, meaning that each portion pulls on the other.

With further reference to a hose subjected to opposing forces, the term strain refers to the relative change in dimensions or shape of the hose that is subjected to stress. For instance, when a hose is subjected to opposing forces, a hose whose natural length is L0 will elongate to a length L1=L0+Delta L, where Delta L is the change in the length of the hose caused by opposing forces. The tensile strain of the hose is then defined as the ration of Delta L to L0, i.e. the ratio of the increase in length to the natural length.

The stress required to produce a given strain depends on the nature of the material under stress. The ratio of stress to strain, or the stress per unit strain, is called an elastic modulus. The larger the elastic modulus, the greater the stress needed for a given strain.

For an elastomeric type material, such as used in hoses, the elongation at break is so high (typically greater than 400 percent) and the stress-strain response so highly nonlinear; it is common practice to define a modulus corresponding to a specified elongation. The modulus for an elastomeric material corresponding to 200 percent elongation typically ranges form 300 psi to 2000 psi. In comparison, the modulus of elasticity for typical plastic matrix material used in a composite tube is from 100,000 psi to 500,000 psi or greater, with representative strains to failure of from 2 percent to 10 percent. This large difference in modulus and strain to failure between rubber and plastics and thus between hoses and composite tubes is what permits a hose to be easily collapsed to an essentially flat condition under relatively low external pressure. This large difference also eliminates the hose's capability to carry high axial tension or compression loads while the higher modulus characteristic of the plastic matrix material used in a composite tube is sufficiently stiff to transfer loads into the fibers and thus resist high external pressure and axial tension and compression without collapse.

The procedure to construct a composite tube to resist high external pressure and compressive loads involves using complex composite mechanics engineering principles to ensure that the tube has sufficient strength. It has not been previously considered feasible to build a truly composite tube capable of being bent to a relatively small diameter, and be capable of carrying internal pressure and high tension and compression loads in combination with high external pressure requirements. Specifically a hose will not sustain high compression and external pressure loads.

Accordingly, it is one object of this invention to provide an apparatus and method for providing a substantially non-ferrous spoolable tube that does not suffer from the structural limitations of steel tubing and that is capable of being deployed and spooled under bore hole conditions.

A further object of the invention is to provide a composite coiled tube capable of working over wells and delivering various chemicals down hole quickly and inexpensively.

Another object of the invention includes providing a coiled tubing capable of repeated spooling and bending without suffering fatigue sufficient to cause fracturing and failing of the coiled tube.

Other objects of the invention include providing a spoolable tube capable of carrying corrosive fluids without causing corrosion in the spoolable tube, providing a coiled tube having less weight, and providing a coiled tube capable of withstanding higher internal pressure levels and higher external pressure levels without loosing tube integrity.

These and other objects will be apparent from the description that follows.

SUMMARY OF THE INVENTION

The invention attains the foregoing objects by providing a composite coiled tube that offers the potential to exceed the performance limitations of isotropic metals currently used in forming coiled tubes, thereby increasing the service life of the coiled tube and extending the operational parameters of the coiled tube. The composite coiled tube of the invention overcomes the disadvantages in present steel coil tubing by providing, among other things, a composite layer that exhibits unique anistropic characteristics capable of providing improved burst and collapse pressures as well as improved tensile strength, compression load strength, and load carrying capability.

The composite coiled tube of the present invention comprises a composite layer having fibers embedded in a matrix and an inner liner formed from polymeric materials or metal. The fibers in the composite layer are oriented to resist internal and external pressure and provide low bending stiffness. The composite coiled tube offers the potential to exceed the performance limitations of isotropic metals, thereby increasing the service life of the tube and extending operational parameters. In addition, the fibers, the matrix, and the liner used in the composite coiled tube can make the tube impervious to corrosion and resistant to chemicals used in treatment of oil and gas wells or in flow lines.

The service life potential of the composite coiled tube constructed in accordance with the invention is substantially longer than that of conventional steel tube when subjected to multiple plastic deformation bending cycles with high internal pressures. Composite coiled tube also provides the ability to extend the vertical and horizontal reach of existing concentric well services. In one operation, the composite coiled tube is deployed as a continuous string of small diameter tubing into a well bore to perform a specific well bore procedure. When the service is completed, the small diameter tubing is retrieved from the well bore and spooled onto a large reel for transport to and from work locations. Additional applications of coiled composite tube are for drilling wells, flowlines, as well as for servicing extended reach applications such as remedial work in wells or flowlines.

In particular, the invention provides for a composite coiled tube having an inner liner and a composite layer enclosing the inner liner. The composite layer contains three fibers oriented in a triaxial braid. A triaxial braid structure is formed of three or more fibers braided in a particular orientation and embedded in a plastic matrix. In a triaxial braid, a first structural fiber helically or axially extends along the longitudinal axis of the tube. A second braiding fiber is clockwise helically oriented relative to the first structural fiber or relative to the longitudinal axis of the tube. A third braiding fiber is counter-clockwise helically oriented relative to the first structural fiber or relative to the longitudinal axis of the tube. In addition, the first structural fiber is interwoven with either the second or the third or both braiding fibers. The composite coiled tube constructed with this triaxial braid structure exhibits unique anistropic characteristics having enhanced burst pressure characteristics, collapse pressure characteristics, increased bending characteristics, tensile loads, and compression loads.

The composite layer can be constructed with a matrix material having a tensile modulus of at least 100,000 psi, a maximum tensile elongation of at least 5%, and a glass transition temperature of at least 180 Degrees Fahrenheit. Increased tube strength can also be obtained by forming a layer having at least 80%, by fiber volume, of the fibers helically oriented relative to the longitudinal axis of the tube at an angle between 30 and 70 degrees.

In accordance with further aspects of the invention, the composite tube includes a liner that serves as a pressure containment member to resist leakage of internal fluids from within the tubing. The inner liner can be formed of metal or co-extruded composite polymers. The polymers forming the liner can also include homo-polymers or co-polymers. The metal or polymeric material forming the liner are impermeable to fluids (i.e. gasses and liquids). The inner liner can also include materials that are chemically resistive to corrosives.

The liner provides a path for conducting fluids (i.e. liquids and gases) along the length of the composite tube. The liner can transmit fluids down hole for operations upon the interior surfaces of the well hole, or the liner can transmit fluids or gases to hydraulic or pneumatic machines operably coupled to the composite tube. That is, the liner can provide a conduit for powering and controlling hydraulic or pneumatic machines. The composite tube can have one liner or a plurality of liners for conducting fluids along the length of the composite tube.

The liner can be constructed to have improved mechanical properties that enhance the bending characteristics, the strength characteristics, and the pressure characteristics of the coiled composite tube. For example, the liner can have a mechanical elongation of at least 25%, and a melt temperature of at least 250 degrees Fahrenheit. The liner can also enhance the pressure characteristics of the composite tube by increasing the bonding strength between the inner liner and the composite layer. This can be achieved by placing groves on the exterior surface of the liner, such that the grooves can hold matrix material that binds the composite layer to the exterior of the liner.

Another feature of the invention includes providing a liner capable of dissipating static charge buildup. A liner having an additive of carbon black can prevent static charge buildup. By preventing static charge buildup, the liner is more likely to prevent the ignition of flammable fluid circulating within the tube.

In a preferred embodiment, the composite layer is formed of three or more fibers interwoven in a triaxial braid and suspended in a matrix material. For example, the composite layer can comprise a helically extending first fiber, a second fiber clockwise extending and helically oriented, and a third fiber counter clockwise extending and helically oriented. The first, second and third fibers are oriented such that the first fiber is interwoven with either the second fiber or the third fiber or both. The composite layer can also include additional plies formed of fiber and matrix. The fibers in the additional plies can have fibers oriented in many ways, including but not limited to, triaxially braiding, biaxially braiding, interwoven and filament wound.

Additional aspects of the invention provide for a separate interface layer interposed between the liner and the composite layer. This interface layer allows the composite coiled tube to withstand extreme pressures inside and outside the tube without causing degradation of the composite tube. The interface layer bonds the composite layer to the liner. In addition, the interface layer can serve as a transition layer between the composite layer and the liner. For example, the interface layer can have a modulus of elasticity between the axial modulus of elasticity of the liner and the axial modulus of elasticity of the composite layer, thereby providing a smooth transition in the modulus of elasticity between the liner and the composite layer.

Other aspects of the invention include a composite coiled tube having a pressure barrier layer. The pressure barrier layer can be located external to the composite layer for preventing fluids (i.e. gases or liquids) from penetrating into the composite tube. The pressure barrier layer also prevents external pressure from being directly applied to the outer surface of the inner liner, thereby preventing exterior pressure from collapsing the inner liner. The pressure barrier layer can be formed of an impermeable material such as either polymeric film (including polyester), thermoplastic, thermoset film, elastomer or metallic film. The impermeable material can be helically or circumferentially wrapped around the composite layer. In addition, the pressure barrier layer can include a fused particle coating. Preferably, the pressure barrier layer has a minimal tensile elongation of 10% and an axial modulus of elasticity of less than 750,000 psi, to aid in the enhanced bending and pressure characteristics of the composite coiled tube.

Further features of the invention provide for a composite tube having an outer protective layer external to the composite layer. The outer protective layer can provide an outer protective surface and an outer wear resistant surface. The outer protective layer can also resist impacts and abrasion. In those aspects of the invention having both a pressure barrier layer and a outer protective layer, the pressure barrier layer is typically sandwiched between the composite layer and the outer protective layer.

An additional feature of the invention is an energy conductor embedded in the composite tube. The energy conductor extends along the length of the composite tube. Energy conductors include electrical medium (such as electrical wiring), optical medium (such as fiber optics), hydraulic medium (such as a fluid impermeable tube), and pneumatic medium (such as a gas impermeable tube). The energy conductors can be embedded within the liner or within the composite layer of the spoolable composite tube.

Energy conductors commonly have low strain capability and thus can be damaged easily by large deformations such as those imposed by bending. These energy conductors are thus oriented in a helical direction relative to the longitudinal axis of the tube. This orientation minimizes the strain on the energy conductor when the tube bends. In an alternative aspect of the invention, the energy conductors can be aligned axially along the length of the tube. Two axially aligned energy conductors that are diametrically opposed along the length of the tube can provide a bending moment along the length of the composite tube, such that the conductors are located on a neutral bending axis that minimizes bending strains on the conductors.

Various embodiments of the invention exist which include one or more aspects and features of the invention described above. In one embodiment, the spoolable composite tube comprises an inner liner and an outer composite layer. In all embodiments, the tube can be designed to include or exclude an interface layer sandwiched between the inner liner and the composite layer. The interface layer increases the bonding strength between the liner and the composite layer. Other embodiments provide for a composite tube including a liner, a composite layer, and a pressure barrier. Further embodiments include a liner, a composite layer, a pressure barrier, and an external protective layer. While in an additional embodiment, the composite tube might include only a liner, a composite layer, and a pressure barrier. The invention also contemplates a spoolable tube having a liner, an inner composite layer, a pressure barrier, and an outer composite layer surrounding the pressure barrier.

BRIEF DESCRIPTION OF THE DRAWINGS

A more complete understanding of the invention may be obtained by reference to the drawings in which.

DETAILED DESCRIPTION OF ILLUSTRATED EMBODIMENTS

Figure 1:
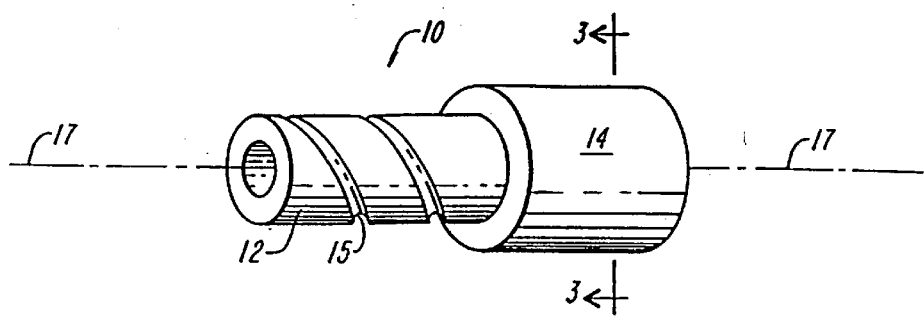
FIG. 1 is a side view, partially broken away, of a composite coiled tube constructed according to the invention that includes a liner and a composite layer.

Composite fibers (graphite, Kevlar, fiberglass, boron, etc.) have numerous assets including high strength, high stiffness, light-weight, etc., however, the stress strain response of composite fibers is linear to failure and therefore non ductile. Composite coiled tubing must therefore address the strain limitations in another manner, i.e., by providing a construction to meet the requirements with a near elastic response or with large deformations of the matrix. Such a composite arrangement must have high resistance to bending stresses and internal pressure and external pressure. It must also have high axial stiffness, high tensile and compressive strength and be resistant to shear stress. All of these properties are combined in the composite tubular member of the invention to provide a coiled tubing which can be bent to a radius compatible with winding onto a reasonable size spool.

P. K. Mallick in the text book entitled *Fiber-Reinforced Composites, Materials, manufacturing and Design*, defines a composite in the following manner: "Fiber-reinforced composite materials consist of fibers of high strength and modulus embedded in or bonded to a matrix with distinct interfaces (boundary) between them. In general, fibers are the principal load-carrying member, while the surrounding matrix keeps them in the desired location and orientation, acts as a load transfer medium between them, and protects them from environmental damages due to elevated temperatures and humidity, for example". This definition defines composites as used in this invention with the fibers selected from a variety of available materials including carbon, aramid, and glass and the matrix or resin selected from a variety of available materials including thermoset resin such as epoxy and vinyl ester or thermoplastic resins such as polyetheretherketone (PEEK), polyetherketoneketone (PEKK), nylon, etc. Composite structures are capable of carrying a variety of loads in combination or independently, including tension, compression, pressure, bending, and torsion.

Webster's Ninth New Collegiate Dictionary defines hose as "a flexible tube for conveying fluids". By comparison, a hose is distinctly different from a composite tube. Hose products such as umbilical lines used in subsea application are constructed of high strength fibers such as aramid, dacron, or nylon laid down in a geodesic pattern onto a substrate plastic liner tubular structure. Alternatively, a hose may be constructed of high strength fibers with a low modulus binder such as rubber. In either case, a hose is designed to carry pressure loads and to exhibit good bending flexibility, but a hose has very limited ability to carry compressive, tension and torsion loads or external pressure.

The composite tube described in this invention cannot only carry high internal pressure but can also carry high compressive, tension and torsion loads, independently or in combination. Such capability is essential if the tubing is to be used for applications such as coiled tubing in which the tubing is pushed into a high pressure reservoir and to overcome the friction to movement within the well bore, especially for highly deviated or horizontal wells. In addition, the tube is required to carry its own weight as it is suspended for 20,000-feet or more in a well bore and to be able to have high pulling capability to extract tools or to overcome being struck from sand and circulating solids which have collapsed around the tube. Such loads in the case of coiled tubing in deep wells can be in excess of 20,000 pounds. In other applications the tubing must also be capable of carrying high torsion loads. It was not considered feasible until the development represented in the current patent application, that one could design and build a composite tube capable of being bent to a relatively small diameter such as required for coiled tubing spooling and simultaneously be capable of carrying internal pressure and other loads.

In forming composite structures, several well known techniques may be used such as pultrusion, fiber winding, braiding and molding. In pultrusion, fibers are drawn through a resin impregnating apparatus, then through dies to provide the desired shape. Alternatively, the resin may be injected directly within the die. Heat forming and curing structures are provided in conjunction with the dies. In fiber winding, the various layers forming the composite structure are each formed by winding or wrapping fibers and a polymer matrix around a mandrel or some other underlying structure that provide a desired shape. Successive composite layers can then be applied to underlying composite layers. A triaxial braiding structure can be manufactured using the fiber winding techniques disclosed in Quigley, U.S. Pat. No. 5,188,872 and in Quigley, U.S. Pat. No. RE 35,081.

FIG. 1 illustrates a composite coiled tube 10 constructed of an inner liner 12 and a composite layer 14. The composite coiled tube is generally formed as a member elongated along axis 17. The coiled tube can have a variety of tubular cross-sectional shapes, including circular, oval, rectangular, square, polygonal and the like. The illustrated tube has a substantially circular cross-section.

Liner 12 serves as a pressure containment member to resist leakage of internal fluids from within the composite coiled tube 10. In one embodiment the liner 12 is metallic, and in an alternative embodiment the liner 12 is formed of polymeric materials having an axial modulus of elasticity exceeding 100,000 psi. A liner having a modulus exceeding 100,000 psi is preferable as it is indicative of a tube capable of carrying high axial tension that does not cause the tube to compress or break. In addition, a liner with an axial modulus of elasticity less than 500,000 psi advantageously allows the liner to bend, rather than pull away from the composite layer, as the composite tube is spooled or bent around a reel.

In the case of a metal liner, the metals forming the liner can include, individually or in combination, steel, copper, or stainless steel. In the case of a polymeric liner, the polymeric materials making up the liner 12 can be thermoplastic or thermoset materials. For instance, the liner can be formed of homo-polymers, co-polymers, composite polymers, or co-extruded composite polymers. Homo-polymers refer to materials formed from a single polymer, co-polymers refers to materials formed by blending two or more polymers, and composite polymers refer to materials formed of two or more discrete polymer layers that have been permanently bonded or fused. The polymeric materials forming the inner liner are preferably selected from a group of various polymers, including but not limited to: polyvinylidene fluoride, etylene tetrafluoroethylene, cross-linked polyethylene ("PEX"), polyethylene, and polyester. Further exemplary thermoplastic polymers include materials such as polyphenylene sulfide, polyethersulfone, polyethylene terephthalate, polyamide, polypropylene, and acetyl.

Liner 12 can also include fibers to increase the load carrying strength of the liner and the overall load carrying strength of the spoolable composite tube 10. Exemplary composite fibers include graphite, kevlar, fiberglass, boron, and polyester fibers, and aramid.

The liner 12 can be formed to be resistive to corrosive chemicals such as heterocyclic amines, inorganic sulfur compound, and nitrogenous and acetylenic organic compounds. Three types of liner material, polyvinylidene fluoride ("PVDF"), etylene tetrafluoroethylene ("ETFE"), and polyethylene ("PE"), have been found to meet the severe chemical exposure characteristics demanded in particular applications involving composite coiled tubing. Two particularly attractive materials for the liner are the RC10-089 grade of PVDF, manufactured by Atochem, and Tefzel® manufactured DuPont.

In other embodiments of liner 12, the liner comprises co-polymers formed to achieve enhanced liner characteristics, such as corrosion resistance, wear resistance and electrical resistance. For instance, a liner 12 can be formed of a polymer and an additive such that the liner has a high electrical resistance or such that the liner dissipates static charge buildup within the composite tube 10. In particular, carbon black can be added to a polymeric material to form a liner 12 having a resistivity on the order of $10^8$ ohms/centimeter. Accordingly, the carbon black additive forms a liner 12 having an increased electrical conductivity that provides a static discharge capability. The static discharge capability advantageously prevents the ignition of flammable fluids being circulated within the composite coiled tube 10.

In a further aspect of the invention, the liner 12 has a mechanical elongation of at least 25%. A liner with a mechanical elongation of at least 25% can withstand the increased bending and stretching strains placed upon the liner as it is coiled onto a reel and inserted into and removed from various well bores. Accordingly, the mechanical elongation characteristics of the liner prolong the overall life of the composite coiled tube 10. In addition, the liner 12 preferably has a melt temperature of at least 250° Fahrenheit so that the liner is not altered or changed during the manufacturing process for forming the composite coiled tubing. A liner having these characteristics typically has a radial thickness in the range of 0.02–0.25 inches.

The liner can act as a vehicle for transmitting chemicals that act upon the interior of the well bore, and the liner can also provide a conduit for transmitting fluids that power or control machines operably coupled with the composite tube. When the liner acts as a hydraulic control line, the liner diameter is typically less than ½ inch. The diameter of the liner can vary, as can the number of liners within the composite tube. For example, the liner can include a plurality of tubes for transmitting different fluids through the composite tube.

The composite layer 14 can be formed of a number of plies, each ply having a fibers disposed with a matrix, such as a polymer, resin, or thermoplastic. The fibers typically comprise structural fibers and flexible yarn components. The structural fibers are formed of either carbon, nylon, polyester, ararnid, thermoplastic, or glass. The flexible yarn components, or braiding fibers, are formed of either nylon, polyester, aramid, thermoplastic, or glass. The fibers included in layer 14 can be woven, braided, knitted, stitched, circumferentially wound, or helically wound. In particular, the fibers can be biaxially or triaxially braided. The composite layer 14 can be formed through pultrusion processes, braiding processes, or continuous filament winding processes. A tube formed of the liner 12 and the composite layer 14 form a composite tube having a maximum tensile strain of at least 0.25 percent and being capable of maintaining an open bore configuration while being spooled on a reel.

The liner 12, illustrated in FIG. 1, can also include grooves 15 or channels on the exterior surface of the liner. The grooves increase the bonding strength between the liner 12 and the composite layer 14 by supplying a roughened surface for the fibers in the composite layer 14 to latch onto. The grooves can further increase the bonding strength between the liner 12 and the composite layer 14 if the grooves are filled with a matrix. The matrix acts as a glue, causing the composite layer to be securely adhered to the underlying liner 12. Preferably, the grooves are helically oriented on the liner relative to the longitudinal axis 17.

Figure 2:
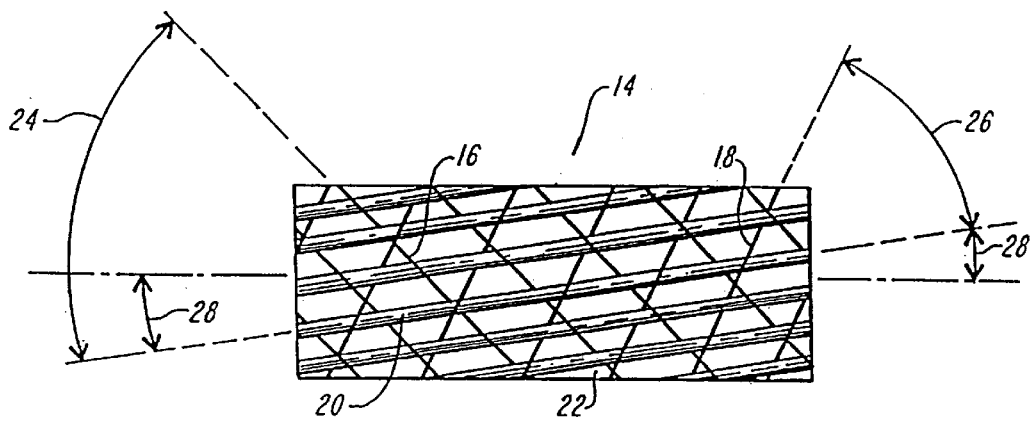
FIG. 2 is a side view of a flattened out composite layer, constructed according to the invention, that has triaxially braided fiber components and which is suitable for constructing the composite layer of the composite tube shown in FIG. 1.

FIG. 2 shows a "flattened out" view of a preferred composite layer 14 having a fiber component 20 interwoven with a plurality of like or different fiber components, here shown as a clockwise helically oriented fiber component 16 and a counterclockwise helically oriented fiber component 18. The configuration of layer 14 shown in FIG. 2, is appropriately denoted as a "triaxially braided" ply. The fiber components 16, 18, 20 are suspended in a matrix 22.

Helically oriented fibers are fibers that follow a spiral path. Typically, helical fibers spiral around a mandrel underlying the composite tube or they spiral around underlying layers of the composite tube. For example, a helically oriented fiber follows a path comparable to the grooves around the shaft of a common screw. A helical fiber can be described as having an axial vector, an angle of orientation, and a wrapping direction. The axial vector indicates that the helical fiber can follow a path along the length of the tube 10 as it spirals around the tube, as opposed to a fiber that continually wraps around a particular section of the tube 10 without extending along the length of the tube. The angle of orientation of the helical fiber indicates the helical fiber's angle relative to a defined axis, such as the longitudinal axis 17. For example, a helical fiber having an angle of 0 degrees is a fiber that extends parallel to the longitudinal axis and that does not wrap around the tube 10, while a fiber having an angle of 90 degrees circumferentially wraps around the tube 10 without extending along the length of the tube. The wrapping direction of the helical fiber is. described as either clockwise or counter-clockwise wrapping around the tube 10.

The fiber components can be formed of carbon, glass, aramid (such as kevlar® or twaron®), thermoplastic, nylon, or polyester. Preferably, fibers 16 and 18 act as braiding fibers and are formed of either nylon, polyester, aramid, thermoplastic, or glass. Fiber 20 acts as a structural fiber and is formed of either carbon, glass, or aramid. Fiber 20 increases the axial strength of the composite layer 14 and the spoolable tube 10.

The matrix material 22 is generally a high elongation, high strength, impact resistant polymeric material such as epoxy. Other alternative matrixes include nylon-6, vinyl ester, polyester, polyetherketone, polyphenylen sulfide, polyethylene, polypropylene, and thermoplastic urethanes.

Fiber 20 extends helically or substantially axially relative to the longitudinal axis 17. The helically oriented fiber component 16 and 18 tend to tightly bind the longitudinal fiber component 20 with the matrix material 22 in addition to providing increased bending stiffness along axis 17 and increased tortional strength around axis 17. The helically oriented fiber components 16 and 18 can be interwoven amongst themselves. To this end, successive crossings of two fiber components 16 and 18 have successive "over" and "under" geometries.

According to a preferred aspect of the invention, the composite layer includes a triaxial braid that comprises an axially extending fiber component 20, a clockwise extending second fiber component 16 and a counter-clockwise extending third fiber component 18, wherein the fiber 20 is interwoven with either fiber 16 or fiber 18. Each helically oriented fiber 16, 18 can therefor be considered a braiding fiber. In certain aspects of the invention, a single braiding fiber, such as fiber 16 binds the fiber component of a given ply together by interweaving the braiding fiber 16 with itself and with the axially extending fiber 20. A fiber is interwoven with itself, for example, by successively wrapping the fiber about the member and looping the fiber with itself at each wrap.

In another aspect of the invention, axially extending structural fiber 20 is oriented relative to the longitudinal axis 17 at a first angle 28. Typically, fiber 20 is helically oriented at the first angle 28 relative to the longitudinal axis 17. The first angle 28 can vary between 5°–20°, relative to the axis. The first angle 28 can also vary between 30°–70°, relative to the axis 17. Although it is preferred to have fiber 20 oriented at an angle of 45° relative to axis 17.

The braiding fiber 16 is oriented relative to structural fiber 20 at a second angle 24, and braiding fiber 18 is oriented relative to structural fiber 20 at a third angle 26. The angle of braiding fibers 16 and 18, relative to structural fiber 20, may be varied between +\−10° and +\−60°. In one aspect of the invention, fibers 16 and 18 are oriented at an angle of +\−20° relative to fiber 20.

One failure mechanism of the composite tube during loading, especially under bending/pressure and tension and compression loading, is believed to be the development of micro-cracks in the resin and the introduction of microscopic defects between fibers. The development of some micro-cracks is also believed to be inevitable due to the severe loads placed on the tube during the manufacturing and bending of the tube. However, the effects of these micro-cracks and microscopic defects can be retarded by restraining the growth and accumulation of the micro-cracks and microscopic defects during the manufacturing and use of the composite coiled tube. The applicants have discovered that the selection of fibers 16 and 18 from the group of fibers consisting of nylon, polyester, glass and aramid mitigates and stops the growth of the microscopic defects. Thus, the selection of fibers 16 and 18 from the particularly noted materials improves the damage tolerance and fatigue life of the composite coiled tubing 10.

Applicant has further determined that the total volume of any particular fibrous material in any selected layer of the composite coiled tube affects the overall mechanical characteristics of the composite coiled tube 10, including a reduction in crack propagation. It additionally follows that the total volume of any particular fibrous material in the whole composite coiled tube also affects the mechanical characteristics of the composite coiled tube 10. A composite coiled tube having improved strength and durability characteristics is obtained by forming a composite layer 14 wherein the combined fiber volume of the clockwise extending and counter-clockwise extending braiding fibers 16 and 18 constitute less than 20% of the total fiber volume in the composite layer 14. Further in accordance with this embodiment, the fiber volume of the axially extending fiber 20 should constitute at least 80% of the fiber volume of the composite layer 14. Preferably, the first composite layer 14 includes at least 80% by fiber volume of substantially continuous fibers oriented relative to the longitudinal axis 17 of the tube at an angle between 30–70 degrees.

When the matrix 20 is added to composite layer 14, the volume of matrix in the layer 14 typically accounts for 35% or more of the volume in the composite layer 14. Accordingly, the combined volume of all the fibers in composite layer 14 account for less than 65% of the volume of the composite layer 14. It is thus evident, that the volume of fibers 16 and 18 account for less than 13% of the total volume of the composite layer 14 and that the volume of fiber 20 accounts for at least 52% of the total volume of the composite layer 14.

Matrix 20 in composite layer 14 is selected such that transverse shear strains in the laminar can be accommodated without breaching the integrity of the coil composite tube 10. The strains generally is the result of bending the spoolable composite tube over the reel. These strains do not impose significant axial stresses on the fiber, but they do impose significant stresses on the matrix 20. Accordingly, matrix 20 should be chosen such that the maximal tensile elongation is greater than or equal to 5%. The Applicant has further shown that choosing a matrix having a tensile modulus of at least 100,000 psi adds to the ability of the coil composite tube to withstand excessive strain due to bending. In accordance with the further aspect of the invention, the matrix 20 also has a glass transition temperature of at least 180° Fahrenheit so that the characteristics of the resin are not altered during high temperature uses involving the coiled composite tube 10. The tensile modulus rating and the tensile elongation ratings are generally measured as the coil composite tube is being manufactured at 70° Fahrenheit. Matrix materials having these characteristics include epoxy, vinyl ester, polyester, urethanes, phenolics, thermoplastics such as nylon, polyropelene, and PEEK.

Figure 3:
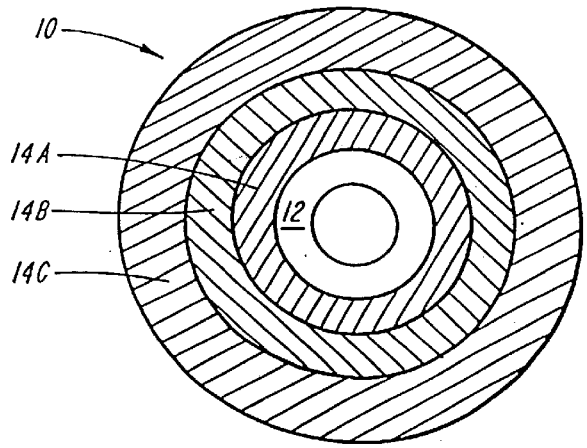
FIG. 3 is a cross-sectional view of the composite coiled tube having an inner liner surrounded by multiple composite layers.

FIG. 3 illustrates a coiled composite tube 10 having an inner liner 12 and a first composite layer 14A, a second composite layer 14B, and a third composite layer 14C. Each of the composite layers is formed of fibers embedded in a matrix, and each of the composite layers successively encompasses and surrounds the underlying composite layer or liner 12. At least one of the composite layers, 14A, 14B, 14C, includes a helically oriented fiber in a matrix. Preferably, at least one of the composite layers 14A, 14B, 14C, contains a ply as described in FIG. 2. In particular, one of the composite layers 14A, 14B, 14C, has a first helically extending fiber, a second clockwise extending fiber, and a third counterclockwise extending fiber wherein the first fiber is interwoven with at least one of the second and third fibers. The other two composite layers contain fiber suspended in a matrix. The fibers can be axially extending, circumferentially wrapped, or helically wrapped, biaxially braided or triaxially braided.

According to one aspect of the invention, the fibers in each of the composite layers are all selected from the same material. In other aspects of the invention, the fibers in each of the composite layers are all selected from the different materials. For example, composite layer 14A can comprise a triaxially braided ply having clockwise and counter-clockwise helically oriented fibers formed of polyester and having a helically extending fiber formed of glass; composite layer 14B can comprise a ply having a circumferentially wound kevlar fiber; and composite layer 14C can comprise a triaxially braided ply having a clockwise and counter-clockwise helically oriented fibers formed of glass and having a helically extending fiber formed of carbon.

The Applicant's have discovered that additional composite layers, beyond the initial composite layer 14 of FIG. 1, enhance the capabilities of the coiled composite tube. In particular, the interaction between the additional composite layers creates a synergistic effect not found in a single composite layer. The Applicant discovered that composite layers having carbon fibers carry proportionately more of the load as the strain in the coiled composite tube 10 increases, as compared to an equivalent design using glass fibers or aramid fibers. While a composite layer using kevlar (i.e. aramid) fibers provide excellent pressure/cyclical bending capabilities to the coiled composite tube 10. The kevlar fibers appear to have a weakness when compared to the carbon fibers in compressive strength. Accordingly, a coiled composite tube 10 incorporating both kevlar and carbon fibers provides a composite structure having improved characteristics not found in composite structures having composite layers formed of only carbon fibers or only kevlar fibers.

Accordingly, one aspect of the invention incorporates a composite layer 14A formed of carbon fibers and polyester fibers in a triaxially braided structure and a second composite layer 14B formed of kevlar fibers. The kevlar fibers can be incorporated into either a conventional bi-axial braid, triaxial braid, or helical braid. For instance, the second composite layer can include two sets of aramid fibers bi-axially braided together. The coiled composite tube 10 having an inner composite layer 14A formed with carbon fibers and an exterior composite layer 14B formed with kevlar fibers provides a coiled composite tube having balanced strength in two directions and provides a coiled composite tube having a constricting force which helps restrain the local buckling of delaminated sublamina and subsequent delamination growth, thereby improving the fatigue resistance of the coiled composite tube 10. Certainly, this aspect of the invention can include a third composite layer 14C external to the second composite layer 14B. The third composite layer 14C can, for instance, include a matrix and a fiber helically oriented relative to the longitudinal axis 17.

In another aspect of the invention, as illustrated in FIG. 3, the composite layer 14A comprises a triaxially braided ply having an axially extending fiber formed of carbon and having a clockwise extending fiber and a counter-clockwise extending fiber both formed of polyester. In addition, the helically extending fiber 20 is oriented at an 45° angle to the axis of the coiled composite tube 10. Further in accordance with this embodiment, composite layer 14B is triaxially braided and comprises a helically extending fiber formed of carbon and oriented at an angle of 45° relative to the axis 17 of coiled composite tube 10. Composite layer 14B further includes a clockwise extending second fiber and a counter-clockwise extending third fiber formed of polyester. The third composite layer 14C, is biaxially braided, and comprises a kevlar fiber extending helically and oriented at a 54° angle to the axis 17 of the composite coiled tube 10.

Figure 4:
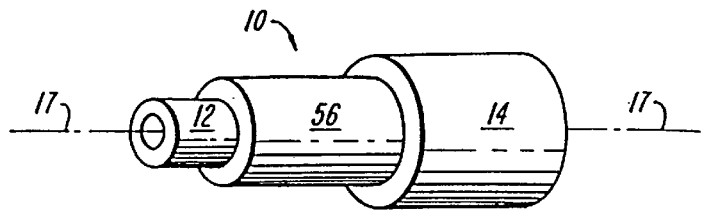
FIG. 4 is a side view, partially broken away, of a composite coiled tube constructed according to the invention having a liner, an interface layer, and a composite layer.

FIG. 4 illustrates a composite coiled tube elongated along an axis 17 and having an inner liner 12, an interface layer 56, and a composite layer 14. The interface layer 56 surrounds the liner 12 and is sandwiched between the liner 12 and the composite layer 14. The interface layer 56 improves the bonding between the inner liner 12 and the composite layer 14.

It is important in the composite coiled tubing 10 that the liner 12 be integrally attached to the composite layer 14. The necessity for a bonded liner is that in certain operating conditions experienced in down hole service, the external surface of the tube will be subjected to higher pressure than the interior of the tube. If the liner is not bonded to the composite layer 14 this external pressure could force the liner to buckle and separate from the composite layer such that the liner collapses. In addition, loading and bending of the tube may introduce microscopic cracks in the composite layer 14 which could serve as microscopic conduits for the introduction of external pressure to be applied directly to the outer surface of the liner 12. Once again, these external pressures could cause the liner 12 to collapse. The interface layer 56 provides a mechanism for bonding the liner 12 to the composite layer 14 such that the liner does not collapse under high external pressures. The interface layer 56 can also reduce cracking and the propagation of cracking along the composite layer 14 and liner 12.

In accordance with one aspect of the invention, the interface layer 56 comprises a fiber reinforced matrix where the fiber volume is less than 40% of the total volume of the interface layer 56. The matrix and the fiber forming interface layer 56 predominately act as an adhesive layer that bonds the liner 12 to the composite layer 14. The fibers within the interface layer 56 can be oriented in various ways, including a woven or non-woven structure. Preferably, the fibers within the interface layer 56 are polyester fibers. An interface layer having this structure is able to prevent the liner from separating from the composite layer even when the differential pressure between the exterior and interior of the tube 10 exceeds 1,000 psi.

The matrix within the interface layer 56 can comprise a filled polymeric layer or an unfilled polymeric layer. A filled polymeric layer uses a polymeric matrix having additives that modify the properties of the polymeric layer. The additives used in the filled polymeric layer include particulates and fibers. For instance, carbon black powder can be added to the polymeric layer to increase the conductivity of the interface layer 56, or chopped glass fibers can be added to the polymeric layer to increase the stiffness of the interface layer 56.

According to a further embodiment of the invention, the interface layer has an axial modulus of elasticity that lies between the modulus of the elasticity of the liner 12 and the modulus of elasticity of the composite layer 14. The interface layer 56 thus has a modulus of elasticity that transitions between the modulus of elasticity of the liner 12 and the composite layer 14. By providing a transitional modulus of elasticity, the interface layer aids in preventing the liner 12 from pulling away from the composite layer 14 during the bending action of the composite coiled tube 10.

The interface layer 56 furthermore increases the fatigue life of the coiled composite tube 10. The structure of the interface layer 56 achieves this by dissipating shear stress applied along the length of the coiled composite tube 10. By dissipating the shear, the interface layer reduces cracking and the propagation of cracks along the composite layer 14.

Figure 5:
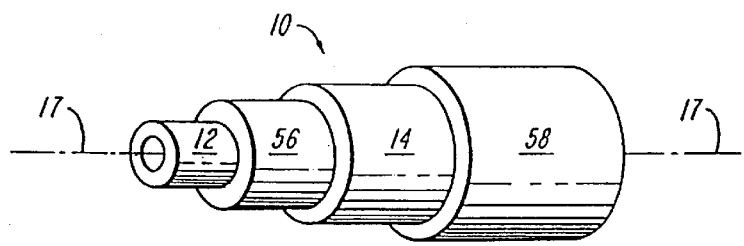
FIG. 5 is a side view, partially broken away, of a composite coiled tube constructed according to the invention having a liner, an interface layer, a composite layer, and a pressure barrier.

FIG. 5 illustrates a composite coiled tube elongated along an axis 17 and having an inner liner 12, an interface layer 56, a composite layer 14, and a pressure barrier layer 58. The pressure barrier layer 58 prevents gases or liquids (i.e. fluids) from penetrating into the composite coiled tube 10.

It is important for two reasons that fluids not penetrate into the composite layer 14. First, a fluid that penetrates through the tube 10 to liner 12 can build up to a sufficient level of pressure capable of collapsing the liner 12. Second, a fluid that penetrates the coiled composite tube 10 during exposure in the well bore 36 may outgas when the coil composite tube 10 is returned to atmospheric pressure.

Accordingly, a coiled composite tube 10 can function effectively without a pressure barrier layer 58 under certain conditions. For example, when micro-fractures and defects in the composite layer 14 do not develop to a size that allows fluids to penetrate the composite layer 14, a pressure barrier layer is not necessary. However, when micro-fractures and passages through the composite layer 14 do allows for the migration of fluids the use of a pressure barrier layer 58 is preferred. As illustrated in FIG. 5, the pressure barrier layer 58 generally is positioned outside of the composite layer 14.

The pressure barrier layer 58 can be formed of a metal, thermoplastic, thermoset films, or an elastomer such as a rubber sheet. All these various materials can function as a pressure barrier because they substantially prevent the diffusion of fluids. Preferable properties of the pressure barrier layer include low permeability to fluids (i.e., gases or liquids), high elongation, and bondability to composite layer 14. It is also preferred that the pressure barrier layer 58 have a maximum tensile elongation of 10% and an axial modulus of elasticity of less than 750,000 psi. These values of tensile elongation and modulus of elasticity are measured at 70° Fahrenheit during the manufacturing of the coiled composite tube 10. The permeability of the pressure barrier layer should be less than 0.4×10 to the −10 ccs per sec-cm$^2$-cm-cmhg.

The impermeable pressure barrier layer 58 can be formed of an impermeable films formed of metals or polymers. For instance, acceptable polymeric films include films formed of polyester, polyimide, polyamide, polyvinyl fluoride, polyvinylidene fluoride, polyethylene, and polypropylene, or other thermoplastics.

The impermeable film of layer 58 can be a seamless polymer layer which is coextruded or formed via a powder deposition process. Alternatively, the impermeable film can be helically wrapped or circumferentially wrapped around the composite layer to form an overlapping and complete barrier. That is, the fiber or material forming the pressure barrier layer must be wrapped in such a fashion that no gaps exist and the pressure barrier layer 58 is sealed.

Another aspect of the invention provides for a pressure barrier layer 58 having a fused particle coating. A fused particle coating is formed by grinding a polymeric material into a very fine powder. The fine power is then heat-fused onto the other materials forming the pressure barrier layer 58 or onto the underlying composite layer 14.

Figure 6:
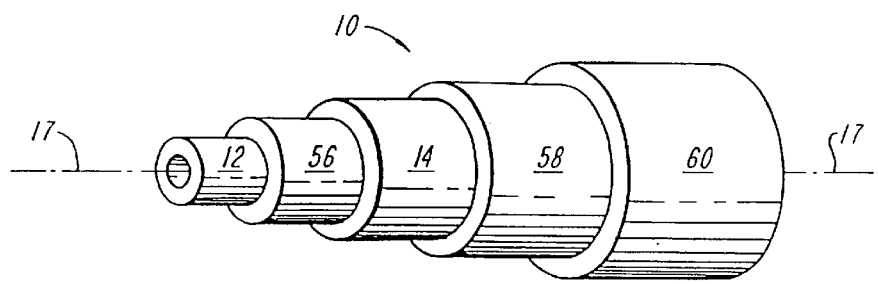
FIG. 6 is a side view, partially broken away, of a composite coiled tube constructed according to the invention that includes a liner, an interface layer, a composite layer, a pressure barrier, and an outer protective layer.

FIG. 6 illustrates a composite coiled tube elongated along an axis 17 and having an inner liner 12, an interface layer 56, a composite layer 14, a pressure barrier layer 58 and an outer protective layer 60. The interface layer 56 enhances the bond between the composite layer 14 to the inner liner 12. The pressure barrier layer 58 prevents fluids from penetrating into the composite coiled tube 10. The outer protective layer 60 provides wear resistance, impact resistance, and an interface layer for the coupling for the coiled composite tube 10. The protective layer is positioned such that it surrounds the pressure barrier 58.

Outer protective layer 60 provides abrasion resistance and wear resistance by forming an outer surface to the coil composite tube that has a low co-efficient of friction thereby causing objects to slip off the coiled composite tube. In addition, the outer protective layer 60 provides a seamless layer for holding the inner layers of the coiled composite tube together. The outer protective layer can be formed of a filled or unfilled polymeric layer. Alternatively, the outer protective layer 60 can be formed of a fiber, such as kevlar or glass, and a matrix. The fibers of the outer protective layer 60 can be woven in a mesh or weave pattern around the inner layers of the coiled composite tube 10, or the fibers can be braided or helically braided around the inner layers of tube 10. In either case, the fibers in the outer protective layer are wrapped helically around the inner layers of the coiled composite tube 10 in order to provide a seamless structure.

It has further been discovered by the Applicant that particles can be added to the outer protective layer to increase the wear resistance of the outer protective layer 60. The particles used can include any of the following, individually or in combination with one another: ceramics, metallics, polymerics, silicas, or fluorinated polymers. Adding Teflon® (MP 1300) particles and an aramid powder (PD-T polymer) to the matrix of the outer protective layer 60 has been found to be one effective way to reduce friction and enhance wear resistance.

Figure 7:
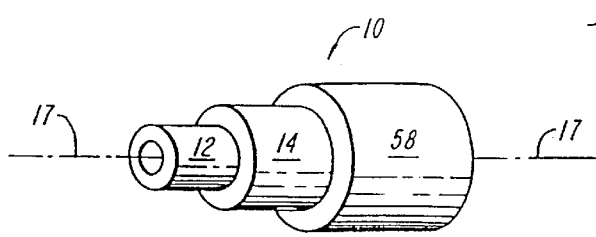
FIG. 7 is a side view, partially broken away, of a composite coiled tube constructed according to the invention that includes a liner, a composite layer, and a pressure barrier.

In the case where the outer protective layer includes fibers, the particles added to the outer protective layer 60 are such that they consist of less than 20% by volume of the matrix. In the case where the outer protective layer does not contain fiber, a particulate such as Teflon® MP 1300 can also be added to the polymeric protective layer. When the outer layer 60 does not include fiber, the particles typically comprise less than 60% by coating volume of the outer wear resistant layer 60, FIG. 7 illustrates an embodiment of the composite coiled tube elongated along an axis 17 and having a liner 12, a composite layer 14, and a pressure barrier 58. FIG. 7 is similar to FIG. 5, except that it lacks the interface layer 56. Particularly, the inner liner 12 is positioned internally to the composite layer 14, and the composite layer 14 is positioned internally to the pressure barrier 58. This figure illustrates, among other things, that the interface layer 56 can either be included or removed from all embodiments of the invention, depending upon whether the circumstances require the use of an interface layer to increase the bonding strength between the liner and the composite layer.

Figure 8:
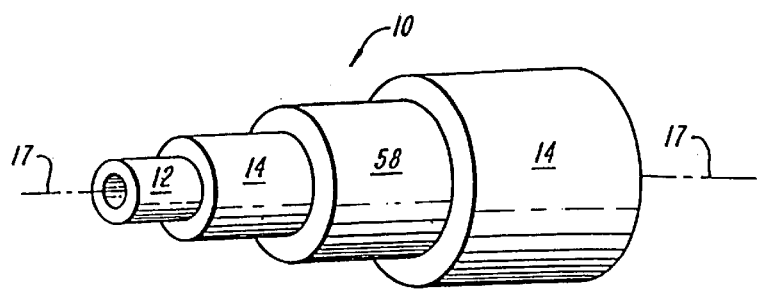
FIG. 8 is a side view, partially broken away, of a composite coiled tube constructed according to the invention comprising a liner, an inner composite layer, a pressure barrier, and an outer composite layer.

FIG. 8 illustrates another embodiment of a composite coiled tube elongated along an axis 17, the composite tube includes a liner 12, a first composite layer 14, a pressure barrier 58, and a second composite layer 14'. In this embodiment, the first composite layer 14 surrounds the internal liner, and the pressure barrier surrounds the first composite layer 14. In addition, the second composite layer 14' surrounds the pressure barrier 58. Particularly, the pressure barrier is sandwiched between two composite layers 14 and 14'.

Composite layer 14' can be structured in any manner that composite layer 14 can be structured, but the layers 14 and 14' need not be identical. In addition, either composite layer 14 or composite layer 14' can include multiple composite layers as illustrated in FIG. 3. The external composite layer 14' proves useful in providing an exterior surface capable of engaging a coupling device.

The external composite layer 14' can also be fashioned to act as an outer protective layer capable of providing abrasion resistance and wear resistance. This can be achieved by forming the external composite layer 14' from a filled or unfilled polymeric layer. The layer 14' can also achieve increased abrasion and wear resistance by helically wrapping or braiding those fibers forming composite layer 14' around the inner layers of the tube 10. Furthermore, the external composite layer 14' can be fashioned to reduce the friction of the exterior of tube 10 by adding particles to the external composite layer 14'. The particles can include ceramics, metallics, polymerics, silicas, or fluorinated polymers.

Figure 9:
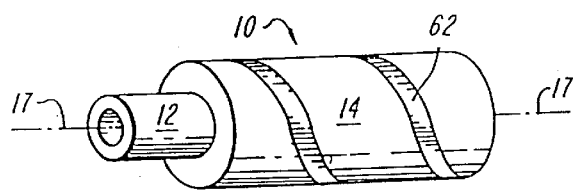
FIG. 9 is a side view, partially broken away, of a composite coiled tube constructed according to the invention that includes an energy conductor.

FIG. 9 illustrates a composite coiled tube elongated along an axis 17 wherein the composite tube includes a liner 12, a composite layer 14, and an energy conductor 62 forming part of the composite layer 14. The energy conductor provides a path for passing power, communication or control signals from the surface down through the tube to a machine attached to the end of the tube.

The energy conductor 62 can be either a hydraulic medium, a pneumatic medium, an electrical medium, an optical medium, or any material or substance capable of being modulated with information data or power. For example, the energy conductor can be a fluid impermeable tube for conducting hydraulic or pneumatic energy along the length of the composite tube. The hydraulic or pneumatic energy can be used to control or power the operation of a machine, such as a submersible pump, operably coupled to the composite tube. Alternatively, the energy conductor can be an electrically conductive medium, such as copper wire, for transmitting a control or power signal to a machine operably coupled to the composite tube. The energy conductor also includes optical medium, such as fiber optics, for transmitting an optical signal along the composite tube. The composite tube can include one or more of the described energy conductors.

The hydraulic control line embodiment of the energy conductor 62 used in the composite tube 10 can be either formed of metal or of a polymeric material. In the case of a metal control line, the metals forming the hydraulic line can include, individually or in combination, steel, copper, or stainless steel. Hydraulic control lines typically have a diameter less than ½ an inch. In the case of a polymeric hydraulic line, the polymeric materials making up the hydraulic line can be thermoplastic or thermoset materials. For instance, the hydraulic line can be formed of homopolymers, co-polymers, composite polymers, or co-extruded composite polymers. The polymeric materials forming the hydraulic line are preferably selected from a group of various polymers, including but not limited to: polyvinylidene fluoride, etylene tetrafluoroethylene, cross-linked polyethylene ("PEX"), polyethylene, and polyester. Further exemplary thermoplastic polymers include materials such as polyphenylene sulfide, polyethersulfone, polyethylene terephthalate, polyamide, polypropylene, and acetyl.

The hydraulic line can also include fibers to increase the load carrying strength of the hydraulic line and the overall load carrying strength of the spoolable composite tube 10. Exemplary composite fibers include graphite, kevlar, fiberglass, boron, and polyester fibers, and aramid.

The hydraulic line embodiment of the energy conductor 62 can be formed to be resistive to corrosive chemicals such as heterocyclic amines, inorganic sulfur compound, and nitrogenous and acetylenic organic compounds. Three types of material, polyvinylidene fluoride ("PVDF"), etylene tetrafluoroethylene ("ETFE"), and polyethylene ("PE"), have been found to meet the severe chemical exposure characteristics demanded in particular applications involving composite coiled tubing. Two particularly attractive materials for the hydraulic line are the RC10-089 grade of PVDF, manufactured by Atochem, and Tefzel® manufactured DuPont.

In other aspects, the hydraulic line embodiment of the energy conductor 62 comprises co-polymers formed to achieve enhanced characteristics, such as corrosion resistance, wear resistance and electrical resistance. For instance, a hydraulic line can be formed of a polymer and an additive such that the hydraulic line has a high electrical resistance or such that the hydraulic line dissipates static charge buildup within the composite tube 10. In particular, carbon black can be added to a polymeric material to form a hydraulic line having a resistivity on the order of $10^8$ ohms/centimeter.

The energy conductor 62 can be located in either the liner, the composite layers, or the pressure barrier forming the tube 10. But is preferable to locate the energy conductors in those layers nearest the interior surface of the tube and not in those layers located near the exterior surface of the tube. If an energy conductor is located near the exterior surface of the tube it is more likely to be subjected to corrosive surfaces or materials located outside the tube 10. In addition, an energy conductor located near the interior of the tube 10 will be subjected to smaller bending strains when compared to an energy conductor located near the exterior of the tube.

Figure 10A:
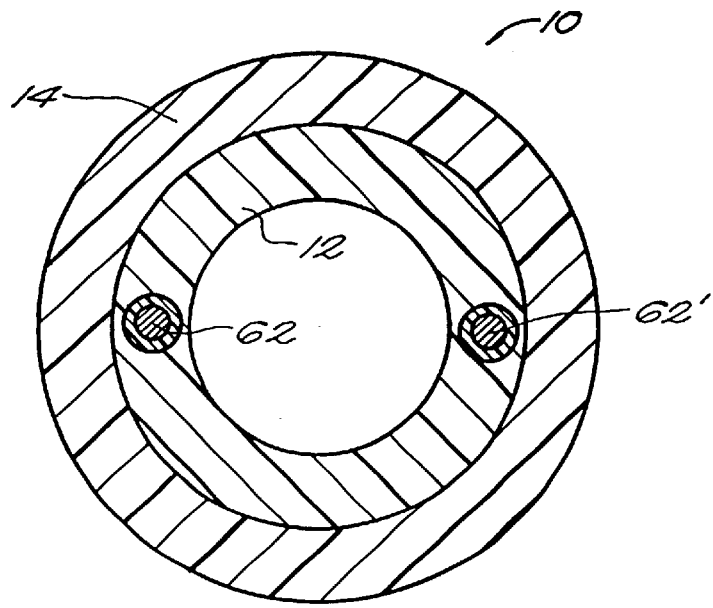
FIG. 10A is a cross-sectional view of the composite tube of FIG. 9 having an axially extending energy conductor embedded in the liner.
Figure 10B:
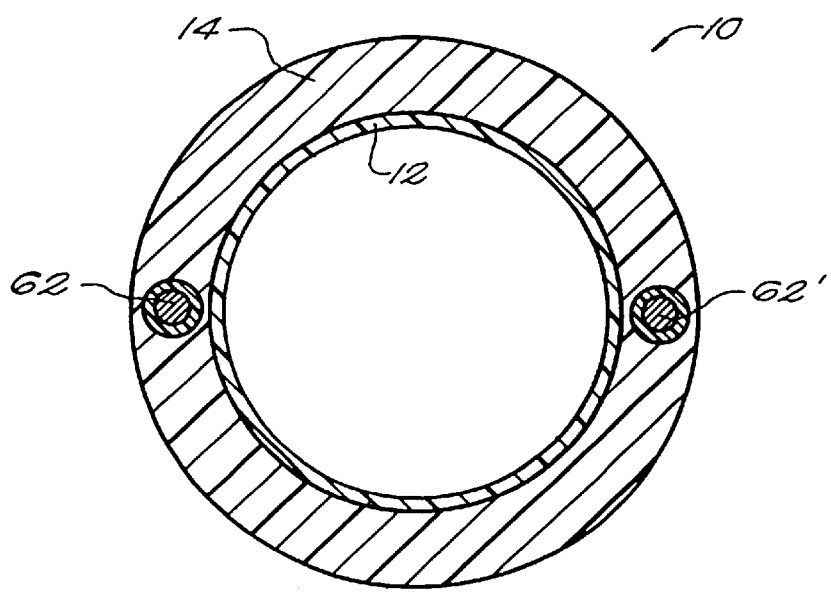
FIG. 10B is a cross-sectional view of the composite tube of FIG. 9 having an axially extending energy conductor embedded in the composite layer.
Figure 10C:
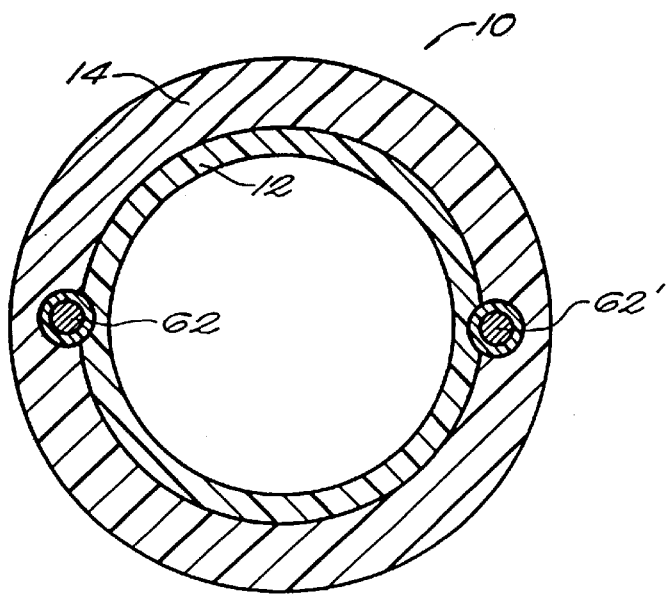
FIG. 10C is a cross-sectional view of the composite tube of FIG. 9 having an axially extending energy conductor embedded between the liner and the composite layer.
Figure 11:
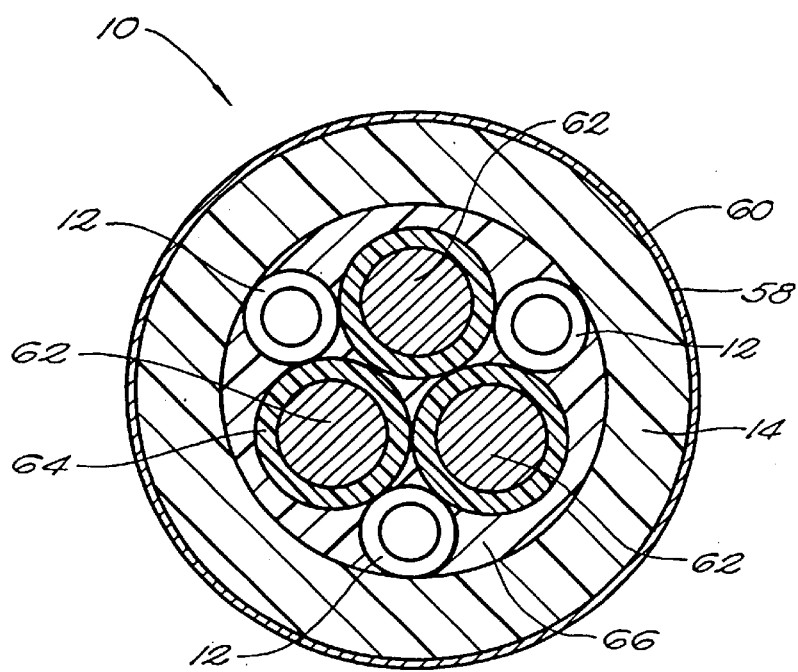
FIG. 11 is a cross-sectional view of the composite tube of FIG. 9 having a composite layer enclosing the liner and the energy conductor.

An energy conductor can be embedded in any of the layers forming the tube 10 using the same methods known in the art for adding a fiber to the composite layer. In various aspects of the invention, as shown in FIGS. 10A–10C, the energy conductor can be either embedded in: the liner; the composite layer; or between the liner and the composite layer. In another aspect, as shown in FIG. 11, both the energy conductor and the liner can be surrounded by the composite layer.

Typically, an energy conductor is wound onto a mandrel or any underlying structure while applying a matrix. Energy conductors can also be added to a fiber composite layer with a pultrusion process. For example, the energy conductor can be drawn through a resin impregnating apparatus, then through dies to provide the desired shape.

A primary concern in placing the conductor 62 in the inner areas of the composite tube 10 is to ensure that the bending strains on the conductor 62 are minimized. This is particularly critical if the conductor 62 is a fiber optic cable. Moreover, the energy conductor 62 can be helically oriented relative to the longitudinal axis 17 of the composite tube to minimize the bending strain on conductor 62. The helical orientation allows the compression strain experienced by the section of the conductor located on the interior bend of the tube to be offset by the expansion strain experienced by the section of the conductor located on the exterior bend of the tube. That is, the conductor 62 is able to substantially distribute the opposing strains resulting from the bending action of the composite tube across the length of the conductor 62, thereby preventing irreparable damage to the conductor.

FIG. 10A is a cross-sectional view of the composite tube 10 having an axially extending energy conductor 62 embedded in the liner 12. By embedding the conductor 62 solely in the liner, bumps in the outer diameter of the composite tube potentially formed by the conductor 62 are eliminated. In particular, the addition of the conductors 62 to the composite tube can cause bumps or ripples in the outer diameter of the composite tube as additional layers of material are added over the conductors. These bumps can be substantially eliminated by embedding the conductor 62 in a liner formed of a polymeric material. When formed of a polymeric, the liner envelopes the conductors and cures in a form that retains a uniform outer diameter.

The conductors can be positioned within the composite tube so that they extend parallel to the axis of the composite tube 10. By orienting the conductor axially along the length of the tube 10, the conductors increase the composite tube's axial stiffness and tensile strength. The effect can be increased by orienting a plurality of conductors 62, 62' axially along the length of the tube 10.

As further shown in FIGS. 10A–10C, the conductors 62, 62' can be oriented so that they are diametrically opposed. This configuration of the composite tube 10 creates a major and minor moment of inertia where the conductors 62, 62' are located in a neutral bending axis. The configuration forces a preferred direction of bending upon the tube 10. In effect, the composite tube 10 has a preferred direction for winding onto a spool by bending about the minor moment of inertia. The advantage of this configuration is that high stiffness and high strength material can be placed in the inner section of the composite tube 10 without significant increase in the associated bending strains or sacrifice in the minimum radius of curvature permitted for spooling. In addition, the placement of the conductors 62, 62' on the neutral bending axis minimizes the bending strains on the conductors, thereby minimizing bending damage to the conductors.

FIG. 10B is a cross-sectional view of the composite tube 10 having an axially extending energy conductor 62 embedded in the composite layer 14. Locating the energy conductors in the fiber composite layer may prove advantageous when the liner 12 is formed of metal. In addition, it typically proves easier to manufacture a composite tube with the energy conductors embedded in the composite layer 14, rather than being embedded in the liner 12.

FIG. 10C is a cross-sectional view of the composite tube 10 having an axially extending energy conductor 62 embedded between the liner 12 and the composite layer 14.

FIG. 11 is a cross-sectional view of the composite tube 10 having the energy conductor 62 and the liner 12 enclosed within the composite layer 14. This aspect of the invention proves particularly important when multiple energy conductors, as shown in FIG. 11, are required. Designs having multiple energy conductors, or having energy conductors with large diameters, require much of the space within the composite tube for the placement of the energy conductors. As a result, it becomes less desirable to embed the energy conductors directly in either the liner or the composite layer. Accordingly, the energy conductors and the liner are both surrounded by the composite layer. As further illustrated in FIG. 11, the composite layer can be enclosed within a pressure barrier 58 and within an outer protective layer 60.

The spaces formed between the energy conductor and the liner are filled with a fill material 66. The spaces arise when the energy conductor and the liner do not completely fill the channel within the composite layer 14. The fill material can be formed of a polymeric material, such as a thermoset or thermoplastic. The polymeric material can be formed of co-polymers, homo-polymers, or composite polymers. In addition, the fill material can include fibers for added structural strength. The fill material binds the energy conductors and the liner to the composite layer. In addition, the fill material provides structural support to the energy conductors and the liner.

FIG. 11 also shows an insulating sheath surrounding the energy conductor 62. The insulating sheath insulates the energy conductor from detrimental external conditions. For instance, in the case of an electrical conductor, the insulating sheath 64 electrically insulates the energy conductor. The insulating sheath can also be fluid impermeable for protecting an underlying electrical conductor from the corrosive effects of external fluids or gases. In the case of optical conductors, the insulating sheath provides an opaque surface for preventing the distortion of optical signals within the energy conductor 62.

In another aspect of the invention, the energy conductors can include a plurality of energy conductors for powering a machine operably coupled to the coiled tube. For instance, the composite tube 10 can include three electrical energy conductors that provide a primary line, a secondary line, and a tertiary line for electrically powering a machine using a three-phase power system. As further illustrated, the composite tube 10 can also include a plurality of liners for transmitting fluids along the length of the tube 10.

Figure 12:
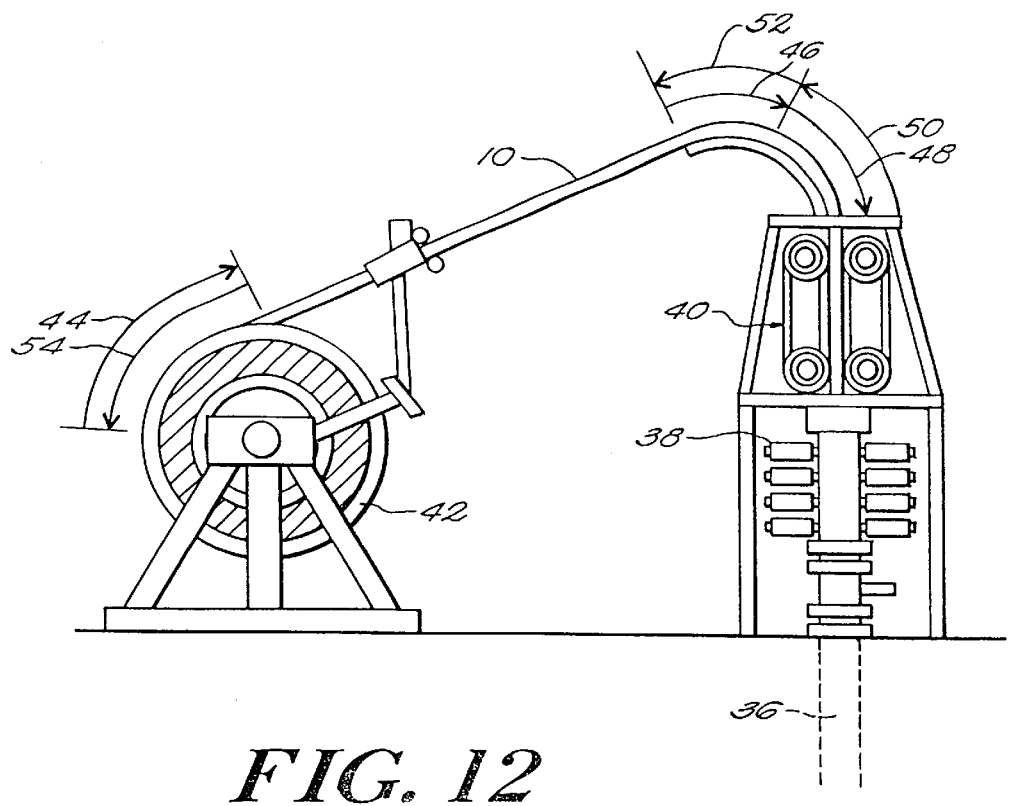
FIG. 12 illustrates the bending events that occur when running coiled tubing in and out of a well bore.

FIG. 12 illustrates the bending cycles that a coiled composite tube 10 is subjected to when performing a typical coiled tubing service. The tubing 10 is inserted and removed from a well bore 36 located below the ground surface. A reel 42 is provided on the surface and the composite coiled tube 10 is stored on the reel 42. An injector assembly 38 is located on the surface over the well bore 36. Injector assembly 38 typically contains a roller belt 40 used to guide the coiled composite tube 10 through the injector assembly 38 into the well bore 36. The coiled composite tube 10 typically is subjected to six bending events as it is inserted and removed from the well bore 36. The first bending event 44 takes place when the coiled composite tube 10 is pulled off the service reel 42. When the coiled composite tube 10 reaches the assembly 38, the coiled tube passes through two bending events 46 and 48. The bending events 50, 52 and 54 are the reverse of bending events 44, 46, 48 and occur as the coiled composite tube 10 is extracted from the well bore 36. The insertion and extraction of the tube 10 thus results in a total of six bending events for every round trip of the coiled composite tube 10. The current steel tubing being used in the field can generally be cycled three times through the bending events described in FIG. 4 in conjunction with high internal pressures before the steel tubing fails. In comparison, the coiled composite tube of the Applicant's invention can be cycled 10,000 times through the bending events described in FIG. 4.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. A spoolable composite tube extending along a longitudinal axis, the composite tube comprising:
    a substantially fluid impervious liner, and
    a first composite layer enclosing the liner, the first composite layer being formed of a first set of fibers embedded in a matrix, at least 80%, by fiber volume, of the fibers of the first set of fibers being helically oriented relative to the longitudinal axis at an angle of between 30° and 70°, the matrix having a tensile modulus of elasticity of at least 100,000 psi to contribute to the ability of the tube to withstand tensile strains imposed on the tube when the tube is spooled on a reel.

2. A composite tube according to claim 1, wherein the tensile modulus of elasticity of the matrix is at least 250,000 psi.

3. A composite tube according to claim 1, wherein the matrix has a maximum tensile elongation of greater than or equal to 5%.

4. A composite tube according to claim 1, wherein the matrix has a glass transition temperature of at least 180° F.

5. A composite tube according to claim 1, wherein the matrix has a tensile modulus of elasticity of at least 250,000 psi, has a maximum tensile elongation of greater than or equal to 5%, and has a glass transition temperature of at least 180° F.

6. A composite tube according to claim 1, wherein the matrix is a thermoplastic having a tensile modulus of elasticity of at least 250,000 psi, having a maximum tensile elongation of greater than or equal to 5%, and having a melt temperature of at least 250° F.

7. A composite tube according to claim 1, wherein the matrix is a thermoplastic or thermoset polymer.

8. A composite tube according to claim 7, wherein the thermoplastic polymer is selected from the group consisting of: polyetherketone (PEK), polyetheretherketone (PEEK), polyetherketoneketone (PEKK), polyesters, polyamides, polyethylenes, polyurethanes, polypropylenes, and polyphenylen sulfide.

9. A composite tube according to claim 7, wherein the thermoset polymer is selected from the group consisting of: epoxy, phenolics, esters, vinyl esters, and polyesters.

10. A composite tube according to claim 1, wherein the matrix is an epoxy having a tensile modulus of elasticity of at least 250,000 psi, a maximum tensile elongation of greater than or equal to 5%, and a glass transition temperature of at least 180° F.

11. A composite tube according to claim 1, further comprising a second composite layer formed of a second set of fibers embedded in a matrix, the second of set of fibers being a different material than the first set of fibers forming the first composite layer.

12. A composite tube according to claim 11, wherein the first set of fibers are glass and the second set of fibers are carbon.

13. A composite tube according to claim 12, wherein the matrix forming the first composite layer and the matrix forming the second composite layer are epoxy.

14. A composite tube according to claim 1, wherein the liner is a thermoplastic polymer having a mechanical elongation of at least 25% and a melt temperature of at least 250° F.

15. A composite tube according to claim 1, wherein the liner is a composite of at least two thermoplastic polymers having a mechanical elongation of at least 25% and a melt temperature of at least 250° F.

16. A composite tube according to claim 1, wherein the liner is a composite of thermoplastic polymer and a metallic material.

17. A composite tube according to claim 1, wherein the liner is a metallic material.

18. A composite tube according to claim 1, wherein an exterior surface of the liner includes grooves or channels to facilitate bonding of the liner to the first composite layer.

19. A composite tube according to claim 1, wherein the first set of fibers is biaxially braided with a second set of fibers within the first composite layer, at least 80%, by fiber volume, of the fibers of the second set of fibers being helically oriented relative to the longitudinal axis at an angle of between 30° and 70°.

20. A spoolable composite tube extending along a longitudinal axis, the composite tube comprising:
 a substantially fluid impervious liner formed from a thermoplastic polymer,
 a first composite layer enclosing the liner, the composite layer being formed of
  a first ply of glass fibers embedded in an epoxy matrix having a tensile modulus of elasticity of at least 250,000 psi., at least 80%, by volume, of the glass fibers of the first ply being clockwise helically oriented relative to the longitudinal axis at a first angle between 30° and 70°,
  a second ply of glass fibers embedded in an epoxy matrix having a tensile modulus of elasticity of at least 250,000 psi., at least 80%, by volume, of the glass fibers of the second ply being counter-clockwise helically oriented relative to the longitudinal axis at the first angle,
  a third ply of carbon fibers embedded in an epoxy matrix having a tensile modulus of elasticity of at least 250,000 psi., at least 80%, by volume, of the glass fibers being clockwise helically oriented relative to the longitudinal axis at a second angle between 30° and 70°, and
  a fourth ply of carbon fibers embedded in an epoxy matrix having a tensile modulus of elasticity of at least 250,000 psi., at least 80%, by volume, of the glass fibers being counter-clockwise helically oriented relative to the longitudinal axis at the second angle.

21. A composite tube according to claim 20, wherein the second ply encloses the first ply and the fourth ply encloses the third ply.

22. A composite tube according to claim 20, wherein the first ply encloses the second ply and the third ply encloses the fourth ply.

23. A composite tube according to claim 20, wherein the first and second plies are adjacent one another and enclose the third and fourth plies.

24. A composite tube according to claim 20, wherein the third and fourth plies are adjacent one another and enclose the first and second plies.

25. A composite tube according to claim 20, wherein the thermoplastic polymer forming the liner has a mechanical elongation of at least 25% and a melt temperature of at least 250° F.

26. A composite tube according to claim 20, wherein the epoxy forming the matrix of the first, second, third and fourth plies have a maximum tensile elongation of greater than or equal to 5%, and a glass transition temperature of at least 180° F.

27. A spoolable composite tube extending along a longitudinal axis, the composite tube comprising:
 a substantially fluid impervious liner,
 a composite layer enclosing the liner, the composite layer being formed of fibers embedded in a matrix, at least 80%, by volume, of the fibers of the composite layer being helically oriented relative to the longitudinal axis at an angle of between 30° and 70',and
 an interface layer interposed between the liner and the composite layer to facilitate bonding of the liner to the interface layer and inhibit collapse of the liner when the tube is subjected to external pressure.

28. A composite tube according to claim 27, wherein the interface layer can inhibit separation of the liner from the composite layer at a differential pressure between the exterior and the interior of the tube exceeding 1000 psi.

29. A composite tube according to claim 27, wherein the interface layer has an axial modulus of elasticity between the axial modulus elasticity of the liner and the axial modulus of elasticity of the composite layer.

30. A composite tube according to claim 27, wherein the interface layer has an axial modulus of elasticity less than or equal to the axial modulus elasticity of the liner.

31. A composite tube according to claim 27, wherein the interface layer comprises a fiber reinforced matrix having a fiber volume of less than 40%.

32. A composite tube according to claim 31, wherein the fibers of the interface layer are polyester fibers.

33. A composite layer according to claim 27, wherein the interface layer is an adhesive layer bonding the liner to the composite layer.

34. A composite tube according to claim 27, wherein the liner is formed from a thermoplastic polymer having a mechanical elongation of at least 25% and a melt temperature of at least 250° F.

35. A composite tube according to claim 27, wherein the matrix forming the composite layer is an epoxy.

36. A composite tube according to claim 35, wherein the epoxy forming the matrix of the composite layer has a tensile modulus of elasticity of at least 250,000 psi, a maximum tensile elongation of greater than or equal to 5%, and a glass transition temperature of at least 180° F.

37. A composite tube according to claim 27, wherein the exterior surface of the liner includes grooves or channels to facilitate bonding of the liner to the composite layer.

38. A spoolable composite tube extending along a longitudinal axis, the tube comprising:
   a substantially fluid impervious liner, and
   a composite layer enclosing the liner, the composite layer being formed of a first ply having a first set of fibers and a second set of fibers embedded in a matrix having a tensile modulus of elasticity of at least 250,000 psi., the first set of fibers and the second set of fibers being helically oriented at a first angle relative to the longitudinal axis of the tube, the first set of fibers being of a different material than the second set of fibers.

39. A composite tube according to claim 38, wherein the composite layer further comprises a second ply having a third set of fibers and a fourth set of fibers embedded in a matrix having a tensile modulus of elasticity of at least 250,000 psi., the third set of fibers and the fourth set of fibers being helically oriented at a second angle relative to the longitudinal axis of the tube, the third set of fibers being of a different material than the fourth set of fibers.

40. A composite tube according to claim 39, wherein the third set of fibers are glass fibers and the fourth set of fibers are carbon fibers.

41. A composite tube according to claim 40, wherein the first set of fibers are carbon fibers and the second set of fibers are glass fibers.

42. A composite tube according to claim 41, wherein the first and second set of fibers of the first ply are clockwise helically oriented and the third and fourth fibers of the second ply are counter-clockwise helically oriented.

43. A composite tube according to claim 42, wherein the first angle is substantially equal to the second angle.

44. A composite tube according to claim 39, wherein the first and second set of fibers of the first ply are counter-clockwise helically oriented and the third and fourth fibers of the second ply are clockwise helically oriented.

45. A composite tube according to claim 44, wherein the first angle is substantially equal to the second angle.

46. A composite tube according to claim 38, wherein the matrix forming the first ply and the matrix forming the second ply is an epoxy.

47. A composite tube according to claim 46, wherein the epoxy forming the matrix of the first ply and the epoxy forming the second ply each have a tensile modulus of elasticity of at least 250,000 psi, a maximum tensile elongation of greater than or equal to 5%, and a glass transition temperature of at least 180° F.

48. A composite tube according to claim 38, wherein the matrix forming the first ply and the matrix forming the second ply is a thernoplastic.

49. A composite tube according to claim 48, wherein the thermoplastic forming the matrix of the first ply and the thermoplastic forming the second ply each have a tensile modulus of elasticity of at least 250,000 psi, a maximum tensile elongation of greater than or equal to 5%, and a melt temperature of at least 250° F.

50. A composite tube according to claim 38, wherein the liner is formed from a thermoplastic polymer.

51. A composite tube according to claim 50, wherein the thermoplastic polymer forming the liner has a mechanical elongation of at least 25% and a melt temperature of at least 250° F.

52. A composite tube according to claim 38, wherein an exterior surface of the liner includes grooves or channels to facilitate bonding of the liner to the composite layer.

53. A spoolable composite tube extending along a longitudinal axis, the composite tube comprising:
   a substantially fluid impervious liner formed from a thermoplastic polymer,
   a composite layer enclosing the liner, the composite layer being formed of a ply having a set of glass fibers and a set of carbon fibers embedded in a matrix having a tensile modulus of elasticity of at least 250,000 psi., at least 80%, by volume, of the glass fibers being helically oriented relative to the longitudinal axis at a first angle of between 30° and 70°, at least 80%, by volume, of the carbon fibers being helically oriented relative to the longitudinal axis at the first angle.

54. A composite tube according to claim 53, wherein the thermoplastic polymer forming the liner has a mechanical elongation of at least 25% and a melt temperature of at least 250° F.

55. A composite tube according to claim 53, wherein the matrix is an epoxy.

56. A composite tube according to claim 55, wherein the epoxy has a maximum tensile elongation of greater than or equal to 5%, and a glass transition temperature of at least 180° F.

57. A composite tube according to claim 53, wherein the matrix is a thermoplastic.

58. A composite tube according to claim 57, wherein the thermoplastic has a maximum tensile elongation of greater than or equal to 5%, and a melt temperature of at least 250° F.

* * * * *

UNITED STATES PATENT AND TRADEMARK OFFICE
CERTIFICATE OF CORRECTION

PATENT NO. : 6,286,558 B1  Page 1 of 1
DATED : September 11, 2001
INVENTOR(S) : Peter Quigley et al.

It is certified that error appears in the above-identified patent and that said Letters Patent is hereby corrected as shown below:

<u>Column 23,</u>
Line 45, please delete "claim 41" and insert -- claim 39 --.

Signed and Sealed this

Fourteenth Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.        : 6,286,558 B1
APPLICATION NO.   : 09/597201
DATED             : September 11, 2001
INVENTOR(S)       : Pater A. Quigley et al.

It is certified that error appears in the above-identified patent and that said Letters Patent is hereby corrected as shown below:

Col. 22, lines 50-52, please replace the words "an interface layer interposed between the liner and the composite layer to facilitate bonding of the liner to the interface layer" with --an interface layer interposed between the liner and the composite layer to facilitate bonding of the liner to the composite layer--.

Signed and Sealed this

Twenty-first Day of August, 2007

JON W. DUDAS
*Director of the United States Patent and Trademark Office*